United States Patent [19]

Winkler et al.

[11] Patent Number: 4,919,978
[45] Date of Patent: Apr. 24, 1990

[54] PRODUCTION OF FIBER COMPOSITES

[75] Inventors: Matthias Winkler, Lenningen; Peter Ittemann; Hans G. Matthies, both of Ludwigshafen, all of Fed. Rep. of Germany

[73] Assignee: BASF Aktiengesellschaft, Ludwigshafen, Fed. Rep. of Germany

[21] Appl. No.: 285,746

[22] Filed: Dec. 16, 1988

[30] Foreign Application Priority Data

Dec. 17, 1987 [DE] Fed. Rep. of Germany ....... 3742833

[51] Int. Cl.[5] ............................................... B05D 3/02
[52] U.S. Cl. ............................. 427/381; 139/420 A; 139/420 C; 427/407.3; 427/412
[58] Field of Search ....................... 139/420 A, 420 C; 427/381, 407.3, 412

[56] References Cited

U.S. PATENT DOCUMENTS 3,971,669  7/1976  Wrzesien et al. ............... 427/412 X
4,695,497  9/1987  Nagy et al. ...................... 427/412 X
4,738,868  4/1988  Fischer et al. .................... 427/53.1

*Primary Examiner*—Michael Lusignan
*Attorney, Agent, or Firm*—Oblon, Spivak, McClelland, Maier & Neustadt

[57] ABSTRACT

Fiber composites produced by impregnating a woven fabric in which parallel reinforcing fibers are held together by thermoplastic filament yarns in an impregnating bath containing from 0 to 50% by weight of a thermoplastic and from 100 to 0% by weight of a solvent for the thermoplastic, evaporating the solvent, and making up are useful for producing finished parts for the automatic sector and for the aerospace industy.

5 Claims, No Drawings

PRODUCTION OF FIBER COMPOSITES

The present invention relates to a process for producing fiber composites where parallel reinforcing fibers are impregnated with a solution of a thermoplastic polymer and the solvent is evaporated. Such a process is described for example in DE-A-3,622,351 (US-A-4,738,868) The reinforcing fibers used there are individual bundles, or rovings, of parallel fibers, for example unidirectional ribbons of fiber from 0.3 to 10 mm in width, and also ribbons of fabric made of glass, carbon or aromatic polyamide.

Customary apparatus for producing prepreg webs based on thermosetting polymers are in general from about 0 to 200 cm in width. Attempts to impregnate as wide laid fabrics of parallel reinforcing fibers in a bath with a solution of thermoplastic polymer come up against practical problems: since the laid fabrics consist of a plurality of rovings in a parallel arrangement, and each roving has been wound on a separate package, several hundred packages would have to be arranged on a creel and the rovings simultaneously unwound from there, collected together and then passed through the impregnating bath. Even if it was possible to solve this equipment problem with some expensive contraption, further problems would present themselves in the subsequent drying of the impregnated web: most thermoplastics are not all that soluble in organic solvents, so that comparatively diluted solutions need to be used. It is therefore necessary to evaporate large amounts of solvent off the impregnated web. The resulting volume reduction leads to tensions in the web which, owing to the lack of transverse cohesion between the reinforcing fibers, can result in transverse cracks. For these reasons the production of wide prepreg webs on the basis of thermoplastic polymers in general proceeds from woven fabrics of reinforcing fibers. However, this is not possible in those cases where the intention is to produce fiber composites which, because of the specific stress to which they are to be exposed, are only to be reinforced in one direction.

It is an object of the present invention to develop a process for producing wide webs of unidirectionally reinforced fiber composites on the basis of thermoplastic polymers.

We have found that this object is achieved when reinforcing fibers are employed in the form of a woven fabric in which parallel reinforcing fibers are held together by thermoplastic filament yarns. This woven fabric is passed through a bath containing from 0 to 50% by weight of a thermoplastic and from 100 to 50% by weight of a solvent for the thermoplastic.

Preference is given here to those fabrics which contain the reinforcing fibers in the warp direction and the thermoplastic filament yarns perpendicularly thereto in the weft direction. In principle, it is also possible to produce multiaxially woven fabrics for use according to the invention. Multiaxially woven fabrics are those in which reinforcing fibers have different orientations in different planes and are held together by thermoplastic filament yarns.

The reinforcing fibers consist of glass, carbon or aromatic polyamides. The fibers are conveniently used in the form of ribbons of roving from 1 to 10 mm in width which are laid in a parallel arrangement and are woven together by means of the thermoplastic filament yarns. The thermoplastics used are those which are soluble in organic solvents, for example polystyrene, amorphous polyamides and polycarbonate, preferably polymers having a glass transition temperature above 120° C., such as polyether sulfones, polysulfone, polyether imides, polyaryl ether thioether nitrile or polyaryl ether thioether sulfide. The thermoplastics are spun in a conventional manner, preferably from the melt, into multifilament yarns having a weight of from 5 to 2500 tex and containing from 5 to 5000 individual filaments The woven fabrics to be used according to the invention can be manufactured in a conventional manner on looms. Preferably, the yarn consists to an extent of from 3 to 60%, in particular of from 5 to 50%, by weight of a thermoplastic The basis weight of the woven fabric is preferably from 80 to 1200 g/m$^2$, in particular from 100 to 600 g/m$^2$ and its width from 10 to 200 cm, preferably from 50 to 165 cm.

The woven fabric is passed according to the invention through an impregnating bath containing from 0 to 50% by weight of a thermoplastic and from 100 to 50% of a solvent for the thermoplastic. The solvent used is preferably dichloromethane. A mixture of dichloromethane and chloroform (as described for example in EP-A-116,282) is also suitable; in particular cases it is also possible to use higher-boiling solvents, for example dimethylformamide or N-methylpyrrolidone.

The fibrous reinforcing material is impregnated with the solution of the thermoplastic in a conventional manner by pulling the woven fabric through an impregnating bath in which the intensity of impregnation may be enhanced by means of suitable deflecting rolls. The viscosity of the solution may be varied within wide limits of from 10 to 20,000, preferably of from 200 to 5,000 mPa.s.

On passing through the impregnating bath the thermoplastic filament yarn of the woven fabric becomes swollen with solvent, and the thermoplastic is uniformly distributed in the reinforcing fibers by capillary forces The reinforcing fibers absorb further thermoplastic from the solution. Preferably, the thermoplastic in the solution and in the filament yarn is the same, although for specific purposes it is also possible to use different polymers. The weight ratio of thermoplastic in the solution: thermoplastic in the woven fabric can be varied within wide limits of from 70:30 to 0:100. After passing through the impregnating bath the woven fabric is guided through squeeze rolls or a nip, by means of which the thermoplastic content of the fiber composite can be selected in a controlled manner. Thereafter the impregnated fibers pass through a drying zone, preferably a vertical tower, where the solvent is evaporated in a conventional manner.

In a preferred embodiment of the invention, the woven fabric is impregnated with a solution containing from 5 to 30% by weight of a thermoplastic. As a consequence of the fact that a portion of the thermoplastic is present in the woven fabric, only comparatively small amounts of impregnating solution need be applied, so that the amount of solvent to be evaporated is also reduced. Not only does this result in a saving of solvent an Lenergy costs, but it also reduces the tendency of the impregnated web to form transverse cracks.

At the extreme, there is a possible embodiment where the solvent bath contains no thermoplastic at all.

The dried impregnated fiber materials can be calendered to produce a uniform surface; they are then made up into semifinished goods by cutting them into sheets or winding them onto reels. The semifinished product obtained can be processed by molding and curing into finished parts which may be used in the automotive sector, in shipbuilding and in the aerospace industry The fiber composites preferably contain from 40 to 70, in particular from 50 to 60, % by volume of reinforcing fibers. They are notable for a high crack resistance, good storability, rapid processability and good fire behavior

EXAMPLE 1

A glass roving (SILENKA EC 14 P 185) of 1200 tex and a 900-tex 140-filament yarn made of the polyether sulfone ULTRASON E 2000 were woven into a plain weave. The warp of the woven fabric was almost exclusively glass fiber roving (4.8 ends/cm), while the weft was exclusively thermoplastic yarn (3.2 picks/cm). This woven fabric was pulled continuously through a dimethylformamide bath. The residence time in the bath was about 90 seconds. In the course of this residence time the polyether sulfone filaments became swollen without dissolving. The solvent was continously removed in hot air dryers at 180° C. The result obtained after drying was a good-quality polyether sulfone prepreg with unidirectional glass fiber reinforcement and a high degree of impregnation. The prepreg had a basis weight of 870 g/m$^2$ and a reinforcing fiber content of 67% by weight.

EXAMPLE 2

A glass roving SILENKA EC 14 P 185) of 1200 tex and a 225-tex 35-filament yarn made of the polyether sulfone ULTRASON E 2000 were woven into a 5-end satin. The warp of the woven fabric was exclusively glass fiber roving (4.8 ends/cm), while the weft was exclusively thermoplastic yarn (1.6 picks/cm). The woven fabric had a basis weight of 648 g/m$^2$. This woven fabric was passed continuously through a solution of 20% by weight of polyether sulfone (ULTRASON E 2000) in methylene chloride. The residence time of the woven fabric in the solution was about 90 seconds. The solvent was removed by means of hot-air dryers at 80° C. The result obtained after drying was a good-quality polyether sulfone prepreg with unidirectional glass fiber reinforcement and a high degree of impregnation. The prepreg had a basis weight of 872 g/m$^2$ and a reinforcing fiber content of 66% by weight.

We claim:

1. A process for producing a unidirectionally or multiaxially reinforced fiber composite by impregnating parallel reinforcing fibers with a solution of a thermoplastic polymer in an organic solvent, evaporating the solvent, and making up, which comprises employing the reinforcing fibers in the form of a woven fabric in which the parallel reinforcing fibers are held together by thermoplastic filament yarns and subsequently passing this woven fabric through a bath containing from 0 to 50% by weight of a thermoplastic and from 100 to 50% by weight of a solvent for the thermoplastic.

2. A process for producing a unidirectionally reinforced fiber composite as claimed in claim 1, wherein the woven fabric used contains reinforcing fibers in the warp direction and thermoplastic filament yarns in the weft direction.

3. A process as claimed in claim 1, wherein the fabric is impregnated with a solution containing from 5 to 30% by weight of a thermoplastic.

4. A process as claimed in claim 1, wherein the fabric is passed through a solvent bath which contains no thermoplastic and the thermoplastic filament yarns present in the woven fabric become incipiently swollen by the solvent and the thermoplastic becomes evenly distributed in the reinforcing fibers 5. A process as claimed in claim 1, wherein the same thermoplastic polymer is used in the thermoplastic filament yarns and in the thermoplastic solution.

* * * * *